United States Patent [19]

Yamagiwa

[11] Patent Number: 4,522,226
[45] Date of Patent: Jun. 11, 1985

[54] VALVE FOR AUTOMATIC STOPPAGE OF WATER SUPPLY

[75] Inventor: Tamio Yamagiwa, Tokyo, Japan

[73] Assignee: Hi-Sonic Co., Ltd., Tokyo, Japan

[21] Appl. No.: 650,528

[22] Filed: Sep. 14, 1984

[30] Foreign Application Priority Data

Oct. 21, 1983 [JP] Japan ............................ 58-163085[U]
Oct. 21, 1983 [JP] Japan ............................ 58-163086[U]

[51] Int. Cl.³ ...................... F16K 21/18; F16K 31/143
[52] U.S. Cl. .................................... 137/390; 137/413; 251/25
[58] Field of Search .............. 137/386, 390, 410, 412, 137/413, 415, 434; 251/14, 15, 19, 28, 29

[56] References Cited

U.S. PATENT DOCUMENTS

| | | | |
|---|---|---|---|
| 1,771,331 | 7/1930 | Hillier | 137/413 |
| 2,062,781 | 12/1936 | De Baufre | 137/390 |
| 2,635,624 | 4/1953 | Chace | 137/390 |
| 2,841,170 | 7/1958 | Kalsey | 137/390 |
| 3,203,444 | 8/1965 | Gravert | 137/390 |
| 4,230,145 | 10/1980 | Badders | 137/410 |

Primary Examiner—George L. Walton
Attorney, Agent, or Firm—Fleit, Jacobson, Cohn & Price

[57] ABSTRACT

A valve comprises a hollow valve seat member having a plurality of openings formed therein and a hollow valve member adapted to be moved under an increased water pressure in a pressure chamber to close the openings in the seat member when water reaches its predetermined level. A manually operating valve member is provided to relieve the water pressure in the pressure chamber, thereby allowing movement of the hollow valve member away from the valve seat member.

2 Claims, 2 Drawing Figures

VALVE FOR AUTOMATIC STOPPAGE OF WATER SUPPLY

BACKGROUND OF THE INVENTION

The present invention relates to a valve for automatic stoppage of water supply adapted to be attached to a tap or a faucet and, more particularly, to a valve which can automatically stop the water supply when a predetermined water level is reached in a bath tub.

A known automatic water supply valve of the type mentioned above has a disadvantage that it is closed quickly when the predetermined water level is reached and, therefore, has to be equipped with a suitable device for preventing water-hammering action which may be caused as a result of the quick closing of the valve. In consequence, the size of the valve is increased undesirably.

It is to be noted also that the valve of the kind described has to be securely supported by a suitable fixing device in attachment of the valve to a faucet which may be of a hot water/cold water mixture type, because it is required to retain the valve at a position of a predetermined water level in the bath tub.

SUMMARY OF THE INVENTION

Accordingly, an object of the invention is to provide a valve for automatic stoppage of water supply which is adapted to be closed gradually to progressively shut-off the water supply at a predetermined water level in a bath tub, thereby not causing the water-hammering action, whereby any need for any water-hammering prevention device is avoided and, the size of the valve as a whole can be reduced.

Another object of the invention is to provide such a valve which permits its easy opening to enable the user to supply water even after the predetermined water level in the bath tub has been reached.

Still another object of the invention is to provide a valve in which, when required by the user, the valve is not closed fully so as to permit an additional supply of water at a small flow rate even after a predetermined water level in the bath tub has been reached.

A further object of the invention is to provide a valve in which, when the water level in a bath tub has come down below a predetermined level, the valve is automatically opened to re-start the water supply.

To this end, according to the invention, there is provided a valve for automatic stoppage of water supply comprising: a valve body having an inlet port adapted to be connected to a faucet and an outlet, the body having its open and closed ends; a hollow valve seat member having a plurality of openings formed therein and fixed at its one end to the interior of the body so as to form a chamber communicating with the outlet port; a cap secured to the open end of the body and having an inner hollow element with a sealing portion on the peripheral surface thereof; a hollow valve member extending between and slidably engaging the hollow valve seat member and the sealing portion of the cap, the hollow valve member being provided at its central portion with a transverse partition wall; a pressure chamber defined between the transverse partition wall and the hollow element of the cap within the hollow valve member; a valve rod extending through the end closure of the body into the chamber and fixed at its inner end to the transverse partition wall, the valve rod having an axial bore and a plurality of radial apertures formed in the wall defining the bore, the chamber and the pressure chamber being communicated with each other through the axial and radial apertures; a valve actuating rod extending through the valve rod and provided at its inner end with a valve member adapted to open and close the open end of the axial bore in the valve rod, the valve actuating rod being provided on the outer end thereof with a knob spaced from the exposed end of the valve rod; a spring adapted to bias the valve member so as to close the open end of the axial bore; a float-type stop valve attached to a bath tub so as to operate at a desired water level; a connecting pipe through which the pressure chamber is connected to the float-type stop valve; and a small aperture formed in the hollow element of the cap and providing a communication between the inlet port and the pressure chamber.

According to another form of the invention, the valve is provided with a spring which is adapted to bias the hollow valve member so as to allow the openings in the valve seat member to open.

In the operation of the valve of the firstmentioned form, the hollow valve member is moved to open the openings in the valve seat member as the knob is depressed while the faucet is opened, so that the water flows into the chamber past the inlet port and the openings in the valve seat member and further flows out of the valve through the outlet opening. In the valve of the second form, the water flows directly from the inlet port through the chamber to the outlet port immediately after the opening of the faucet.

Meanwhile, a part of the water comes into the pressure chamber through the small aperture formed in the wall of the cap. This water, however, is discharged through the connecting pipe because in this state the float-type stop valve is kept open. When a predetermined water level is reached in the bath tub, the float-type stop valve is closed so that the water pressure in the pressure chamber is raised to progressively more the hollow valve member in such a manner as to gradually close the openings in the valve seat member. When it is desired to additionally supply the water after the closing of the valve, the user simply depresses the knob so that the valve actuating rod is pushed to open the valve member. As a result, the water in the pressure chamber is relieved into the chamber through the axial bore and the radial apertures to decrease the pressure in the pressure chamber. A further depression of the knob lightly drives the valve rod and, hence, the hollow valve member inwardly so as to keep the openings in the valve seat member open. Needless to say, when the knob is released, the valve member is moved outwardly by the rise of the water pressure in the pressure chamber so that the valve member is moved without delay to close the openings in the valve seat member, thereby stopping the water supply.

When the water level in the bath tub has come down below the predetermined level, the float-type stop valve is opened so that the pressure in the pressure chamber is decreased. Therefore, if an additional water supply to the bath tub is necessary, the user can open the openings in the valve seat member by moving the hollow valve member through a depression of the knob with a small force.

In the case of the second form of the valve of the invention, when the water pressure in the pressure chamber is decreased, the hollow valve member is automatically moved under the action of the spring to thereby open the openings in the valve seat member.

The valve of the invention can also be used in such a mode that, when the predetermined water level is reached in the bath tub, the opening in the valve seat member is not fully closed but is kept in a partially opened state. To this end, an adjuster may be screwed around the valve rod on the hollow valve member. The adjuster is capable of abutting the inner surface of the end closure of the body so as to limit the stroke of the hollow valve member. By varying the position of the adjuster with respect to the valve rod, it is possible to obtain an operation mode in which the supply of the water is continued even after the predetermined level is reached in the bath tub.

BRIEF DESCRIPTION OF THE DRAWINGS

Preferred embodiments of the valve in accordance with the invention will be described hereinunder with reference to the accompanying drawings.

DESCRIPTION OF THE PREFERRED EMBODIMENT

Figure 1:
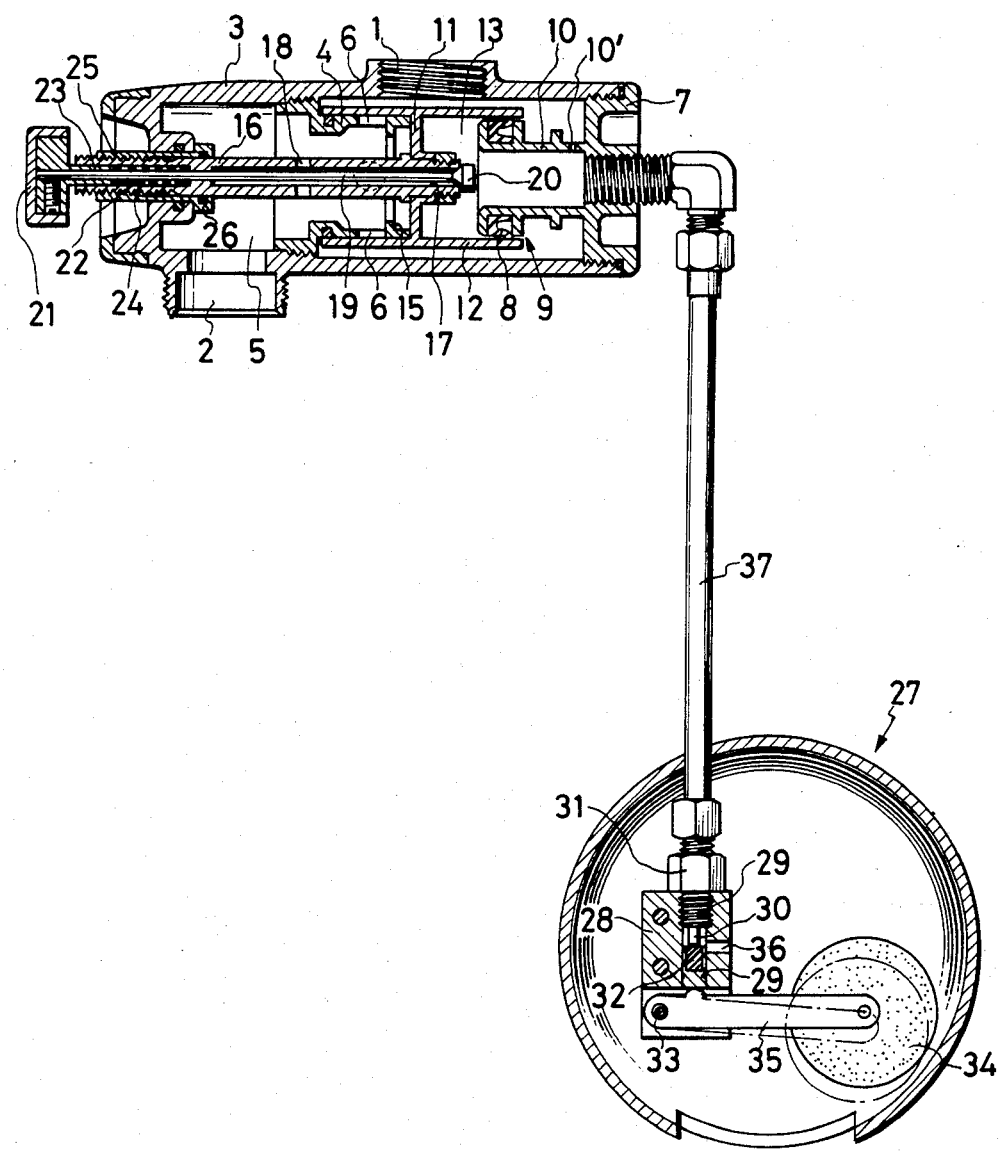
FIG. 1 is a sectional view of a first embodiment of a valve in accordance with the invention.

Referring first to FIG. 1, a valve embodying the present invention comprises a body 3 having an inlet port 1 adapted to be connected to a water faucet which may be of the hot water/cold water mixture type and an outlet port 2 to which a water discharge pipe is connected. The inlet and outlet ports are positioned on the opposite sides of the body 3. The body 3 is opened at its one end and closed at the other end. A hollow valve seat member 4 is threadedly secured to the inside of the body 3 to define a chamber 5 in the body 3, which communicates with the outlet port 2. The seat member 4 is provided with a plurality of openings 6 formed in the peripheral wall thereof.

A cap 7 is threadedly secured to the open end of the body 3 to close the open end. The cap 7 include a hollow element 10 which is provided with a sealing portion 9 having a seal ring 8 fitted in the sealing portion 9. A hollow valve member 12 extends between the hollow valve seat member 4 and the sealing portion 9 of the hollow element 10 of the cap 7 to slidably engage them. A pressure chamber 13 is defined between the hollow element 10 of the cap 7 and a transverse partition wall 11 of the valve member 12 and communicates with the inlet port 1 through a small aperture 10' formed in the hollow element 10 of the cap 7. A valve rod 16 extends into the chamber 5 through the closed end of the body 3. The inner end of the valve rod 16 is fixed to the transverse partition wall 11 of the hollow valve member 12 by any suitable means. The valve rod 16 has a bore 17 extending axially therethrough and opening into the pressure chamber. The chamber 5 and the pressure chamber 13 are communicated with each other through the bore 17 and the radial apertures 18 formed in the wall of the valve rod 16. A valve actuating rod 19 extends through the valve rod 16. A valve member 20 is provided for opening and closing the open end of the bore 17 and attached to the inner end of the valve actuating rod 19. A knob 21 is fixed to the outer end of the valve actuating rod 19 in spaced relation from the exposed end of the valve rod 16 a suitable distance. Preferably, the knob 21 is provided with a projection 23 which is received in a bore 22 formed in the outer end portion of the valve rod 16. A spring 24 is disposed round the valve actuating rod 19 between the projection 23 and the bottom of the bore 22, so as to bias the valve member 20 normally in the direction to close the open end of the bore 17.

An adjuster 25 is threadedly engaged on the outer periphery of the valve rod 16 and provided at the inner end thereof with an abutment 26 which is adapted to abut the inner surface of the end closure of the body 3 so as to limit the movement of the hollow valve member 4.

A float-type stop valve 27 is positioned, for example, in the overflow opening (not shown) of a bath tub, by any suitable fixing members in such a manner as to allow an over-flow. In the case where the bath tub has no over-flow opening, the stop valve 27 may be attached to the inner wall surface of the bath tub at a suitable level by means of an adhesive. The stop valve 27 is constituted by a valve body 28 fixed to a supporting disc, a pipe fitting 31 screwed to the valve body 28 and having an outlet pipe 30 extending into the bore 29 of the valve body 26, a valve element 32 in the bore 29 adapted to be brought into and out of contact with the lower end of the outlet pipe 30, an actuating lever 35 for actuating the valve element 32 in the bore 29 and pivotally secured at its one end to the lower end of the valve body 28, the other end of the actuating lever 35 being provided with a float 34, and a discharge port 36 through which the bore 29 is opened to the space in the bath tub. A connecting pipe 39 is connected between the fitting 31 and the cap 7 so that the pressure chamber 13 is communicated with the inside of the float-type stop valve 27 through the connecting pipe 37.

Figure 2:
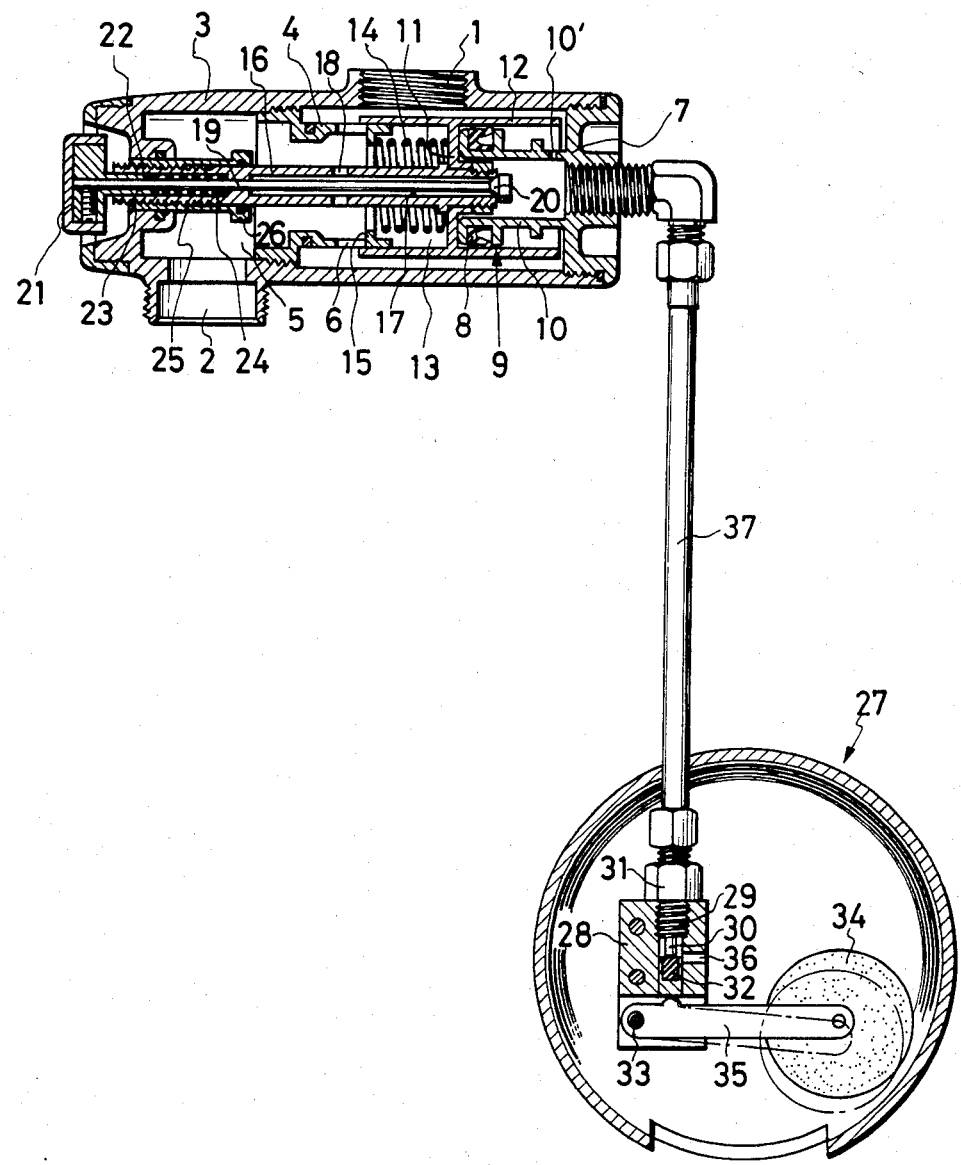
FIG. 2 is a sectional view of a second embodiment of the valve in accordance with the invention.

FIG. 2 shows an embodiment similar to the first embodiment except that a spring 14 is disposed between an annular projection 15 on the hollow valve member 4 and the transverse partition wall 11 so as to bias the hollow valve member 12 to its open position. The spring 14 may be of a strength and size such that the hollow valve member 12 is retained in its position where the openings 6 are fully or partially opened.

In the operation of the first embodiment on the assumption that the water faucet is opened, as the knob 21 is depressed, the hollow valve member 12 is pressed to open the openings 6 in the valve seat member 4 so that the water flows into the chamber 5 through the openings 6 in the valve seat member 4. The water from the chamber 5 is then discharged into the bath tub through the outlet port 2. In case of the second embodiment, the water is discharged into the bath tub through the inlet port 1 and the outlet port 2 immediately after the opening of the faucet valve, without requiring depression of the knob 21. Meanwhile, a part of the water flows into the pressure chamber 13 through the small aperture 10'. In this state, however, since the float 34 takes the lowermost position to keep the valve element 32 downwardly away from the outlet pipe 30, the water in the pressure chamber 13 is discharged through the connecting pipe 37 into the bath tub. Therefore, the water pressure in the pressure chamber 13 does not increase and the hollow valve member 12 is held at the position where the openings 6 in the valve seat member 4 are kept open.

When the water level in the bath tub reaches the over-flow opening of the bath tub, the float 34 is moved upwardly to swing upwardly the actuating lever 35 which in turn moves the valve element 32 upwardly in the bore 29 to close the outlet pipe 30. Consequently, the water pressure in the pressure chamber 13 is increased so that the hollow valve member 12 is gradually moved to the left by the force produced by the increasing water pressure in the pressure chamber 13 due to the difference in the pressure-receiving area on both sides of the transverse partition wall 11, thereby progressively closing the openings 6 in the valve seat member 4. Consequently, any undesirable water-hammering action due to closing of the valve is avoided without fail.

According to the invention, it is possible to continue the water supply or to additionally supply the water even after the closing of the valve. This can be achieved simply by depressing the knob 21. As the knob 21 is depressed, the valve member 20 is moved away from the open end of the bore 17 in the valve rod 16 so that the water in the pressure chamber 13 is relieved into the chamber 5 through the bore 17 and the radial apertures 18. Consequently, the water pressure in the pressure chamber 13 is decreased. As the knob 21 is further depressed, the knob 21 is brought into contact with the end of the valve rod 16 to press the latter, so that the hollow valve member 12 is lightly pressed to the right to open the openings 6 in the valve member 4 thereby discharging water from the inlet port through the chamber 5 and outlet port 2 into the bath tub. The knob 21, when released, is forced back by the spring 24 so that the valve body 20 is moved to the position for closing the open end of the bore 17. In consequence, the water pressure in the pressure chamber 13 is increased to urge the hollow valve member 12 leftwards, thereby closing the openings 6.

When the water level in the bath tub comes down, the float 34 is moved downwardly to swing the actuating lever 35 downwardly, so that the valve element 32 is moved away from the outlet pipe 30 to open the latter. In consequence, the water in the pressure chamber 13 is relieved into the bath tub through the connecting pipe 37, outlet pipe 30, and the discharge port 36, so that the water pressure in the pressure chamber 13 is decreased. If the user wishes to supply the water to the bath tub in this state, he simply depresses the knob 21 so that the hollow valve member 12 is moved to the right so as to open the openings 6 in the valve seat member 4. In consequence, the water is supplied to the bath tub so as to establish the water level again.

In the second embodiment, when the water pressure in the pressure chamber comes down, the hollow valve member 12 is automatically moved rightwardly under the action of the spring 14 to open the openings 6 in the valve seat member 4. Thus, the water supply is commenced automatically to establish the water level each time the water level in the bath tub falls.

According to the invention, it is possible to make such an arrangement that, when the predetermined water level is reached, the valve is not fully closed but is closed only partially so that the water supply will continue at a reduced flow rate. This can be achieved by externally rotating the adjuster 25 with respect to the valve rod 16 so as to vary the position of the adjuster 25 by the screwing action. As the adjuster moves forwardly along the valve rod 16, the distance between the abutment 26 and the closed end of the spigot body 3 is changed. When the hydraulic pressure in the pressure chamber 13 causes the hollow valve member 12 to move to the left, the abutment 26 of the adjuster 25 abuts the inner surface of the closed end of the body 3 to limit the movement of the hollow valve member 12 so as to keep the openings 6 in the valve seat member 4 in the open state.

As will be understood from the foregoing description, the valve for automatic stoppage of liquid supply according to the invention is constructed to achieve various functions and can be attached to a faucet directly without requiring any fixing device owing to its small-sized structure.

I claim:

1. A valve for automatic stoppage of water supply comprising: a valve body having an inlet port adapted to be connected to a faucet and an outlet, said body having its open and closed ends; a hollow valve seat member fixed at its one end to the interior of said valve body so as to form a chamber communicating with said outlet port and having a plurality of openings formed therein; a cap secured to the open end of said body and having an inner hollow element with a sealing portion; a hollow valve member extending between and slidably engaging said hollow valve seat member and said sealing portion of said cap, said hollow valve member being provided at its central portion with a transverse partition wall; a pressure chamber formed between said transverse partition wall and said hollow element of said cap within said hollow valve member; a valve rod extending through the end closure of said valve body into said chamber and fixed at its inner end to said transverse partition wall, said valve rod having an axial bore and a plurality of radial apertures formed in the wall defining said bore, said chamber and said pressure chamber being communicated with each other through said axial and radial apertures; a valve actuating rod extending through said valve rod and provided at its inner end with a valve member adapted to open and close the open end of said axial bore in said valve rod, said valve actuating rod being provided on the outer end thereof with a knob spaced from the exposed end of said valve rod; a spring adapted to bias said valve member so as to close the open end of said axial bore; a float-type stop valve attached to a bath tub so as to operate at a desired water level; a connecting pipe through which said pressure chamber is connected to said float-type stop valve to allow pressurization and depressurization of said pressure chamber; a small aperture formed in said hollow element to provide a communication between said inlet port and said pressure chamber to pressurize said pressure chamber to maintain the hollow valve member closed and said valve actuating rod being operable independently to actuate said valve actuating rod valve member to allow the water supply to the bath tub even when said float-type stop valve closes said connecting pipe when the desired water level has been reached.

2. A valve for automatic stoppage of water supply comprising: a valve body having an inlet port adapted to be connected to a faucet and an outlet, said body having its open and closed ends; a hollow valve seat member fixed at its one end to the interior of said valve body so as to form a chamber communicating with said outlet port, and having a plurality of openings formed therein; a cap fitted to the open end of said body and having an inner hollow element with a sealing portion; a hollow valve member extending between and slidably engaging said hollow valve seat member and said sealing portion of said cap, said hollow valve member being provided at its central portion with a transverse partition wall; a spring adapted to bias said hollow valve member so as to open the openings in said hollow valve member; a pressure chamber formed between said transverse partition wall and said hollow element of said cap within said hollow valve member; a valve rod extending through the end closure of said body into said chamber and fixed at its inner end to said transverse partition wall, said valve rod having an axial bore and a plurality of radial apertures formed in the wall defining said bore, said chamber and said pressure chamber being communicated with each other through said axial and radial apertures; a valve actuating rod extending through said valve to allow pressurization and depressurization of said pressure chamber rod and provided at its inner end with a valve member adapted to open and close the open end of said axial bore in said valve rod, said valve actuating rod being provided on the outer end thereof with a knob spaced from the exposed end of said valve rod; a spring adapted to bias said valve member so as to close the open end of said axial bore; a float-type stop valve attached to a bath tub so as to operate at a desired water level; a connecting pipe through which said pressure chamber is connected to said float-type stop valve; a small aperture formed in said hollow element to provide a communication between said inlet port and said pressure chamber to pressurize said pressure chamber to maintain the hollow valve member closed and said valve actuating rod being operable independently to actuate said valve actuating rod valve member to allow the water supply to the bath tub even when said float-type stop valve closes said connecting pipe when the desired water level has been reached.

* * * * *